Oct. 7, 1947.   W. A. AYRES   2,428,351
RADIO WAVE REFLECTIVITY INDICATING SYSTEM
Filed Jan. 22, 1943   2 Sheets-Sheet 1
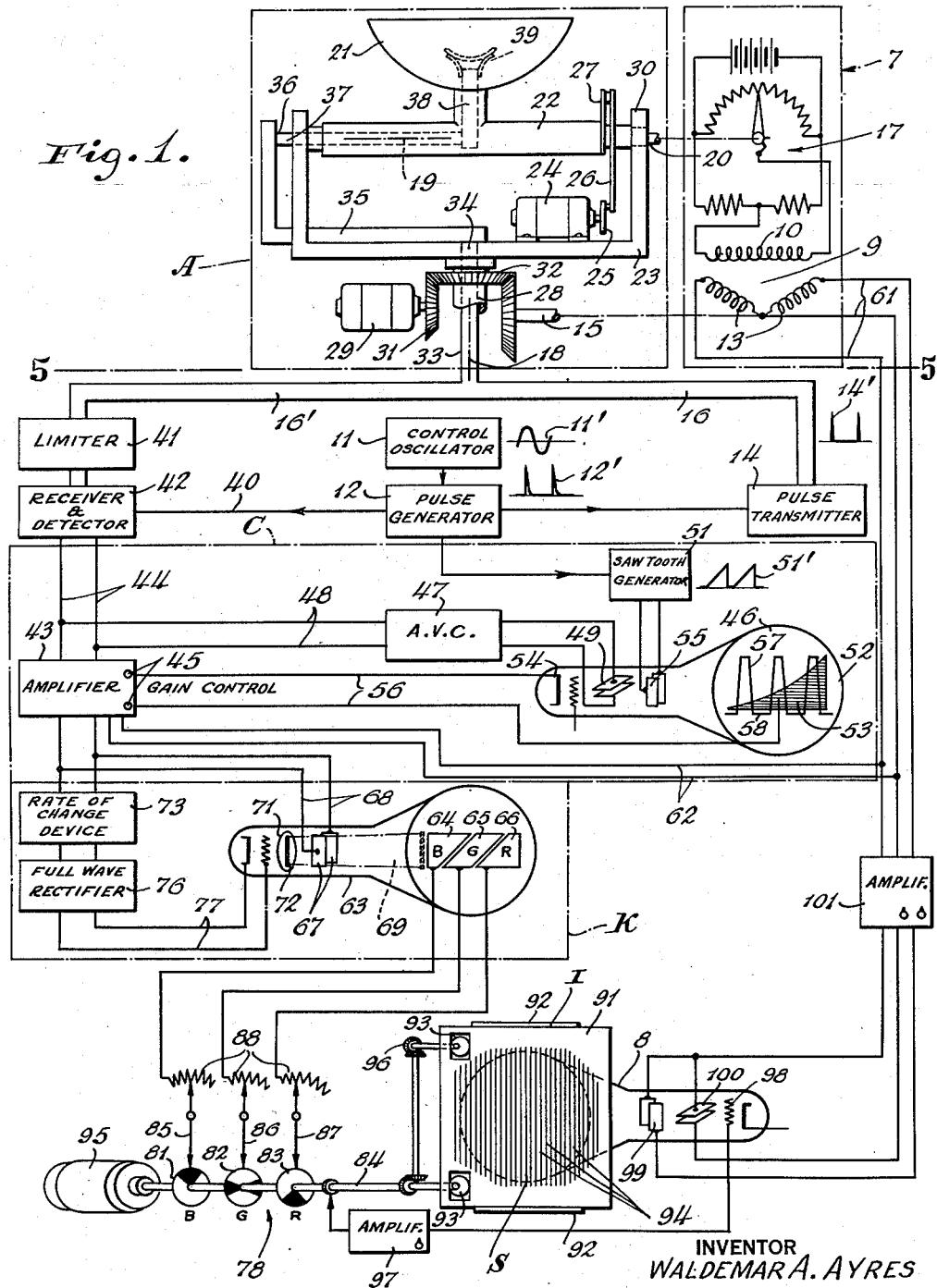
INVENTOR
WALDEMAR A. AYRES
BY
ATTORNEY Oct. 7, 1947.   W. A. AYRES   2,428,351
RADIO WAVE REFLECTIVITY INDICATING SYSTEM
Filed Jan. 22, 1943   2 Sheets-Sheet 2
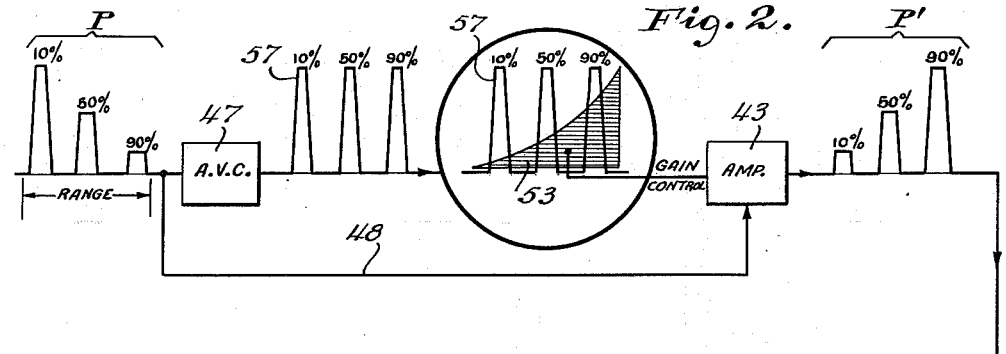
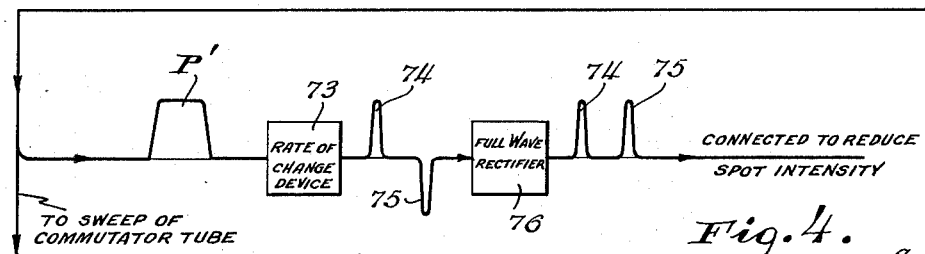
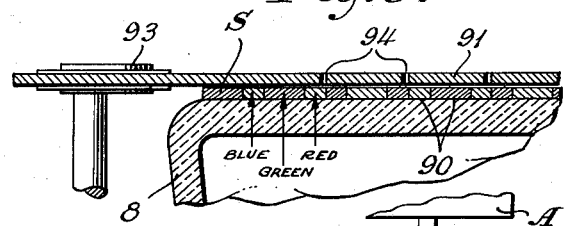
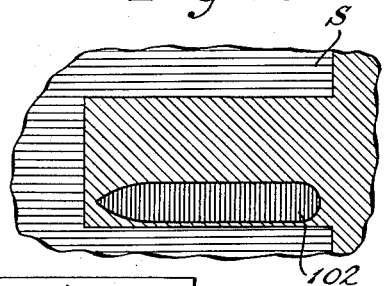
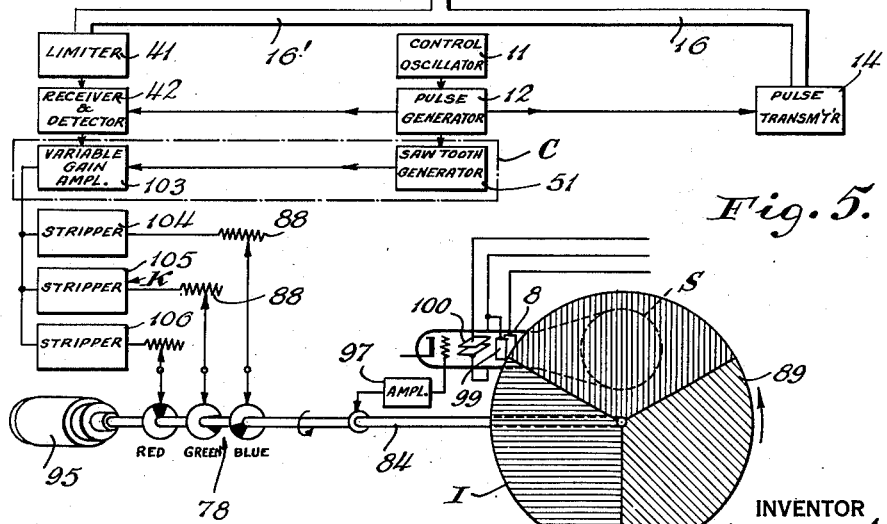
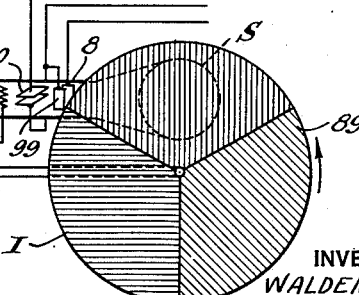
INVENTOR
WALDEMAR A. AYRES
BY
ATTORNEY Patented Oct. 7, 1947

2,428,351

UNITED STATES PATENT OFFICE 2,428,351

RADIO WAVE REFLECTIVITY INDICATING SYSTEM

Waldemar A. Ayres, Kew Gardens Hills, N. Y., assignor to Sperry Gyroscope Company, Inc., Brooklyn, N. Y., a corporation of New York Application January 22, 1943, Serial No. 473,260

15 Claims. (Cl. 250—1.74)

1

This invention relates to the art of object scanning, and more particularly to methods of and apparatus for surveying objects with electromagnetic energy and forming representations of the scanned objects in a form characteristic of the reflectivity of the respective portions to such energy, and substantially independent of the distance between such portions and the surveying apparatus.

It is well known that the reflectivity of different objects to electro-magnetic waves is a function of various factors, principally among which is the material of which the object is formed, and the nature of its reflecting surfaces. The present invention makes practical application of these factors, and provides means whereby irradiated objects may be rendered visually distinguishable on a reproducing screen as a function of the physical composition or nature of the surfaces of the objects, or portions thereof. Thus the pilot of an aircraft or other vehicle may be provided with apparatus that scans a terrain with radio waves, and forms an image that clearly distinguishes land from water or metal objects, irrespective of the range of such objects. Such an image may be formed on a cathode ray picture tube to provide a navigational guide that allows the pilot to steer his craft properly with respect to rivers, shore lines, or other land marks.

The respective portions of each image are suitably shaded, toned, colored, or otherwise characterized to render them visually distinct. Although means are herein disclosed whereby such portions may be chromatically modulated in terms of reflectivity, the images otherwise may be characterized by flicker, lateral oscillation, or the like, as by means more particularly pointed out in my copending application Ser. No. 468,298, filed December 7, 1942. Images, as herein referred to, comprise light and dark representations of the elements forming the entire reproduction, considered either singly or collectively, the fineness of detail of an entire picture being dependent upon the number of dots or points of light utilized per unit area.

The principal objects of the present invention are: to provide improved methods of and apparatus for irradiating objects or distant bodies with electromagnetic waves, and for forming images of said objects as a function of the reflectivity of said objects to said waves; to provide a system for forming images of irradiated objects and for compensating for attenuation due to range; to provide in such a system means for chromatically modulating or otherwise visually distinguishing

2 the images or portions thereof as a function of the reflectivity of the corresponding portions of the objects; and to provide a system for deriving signals from radiant energy reflections which signals are compensated for range attenuation. These and other objects will become more fully apparent from the following description and from the accompanying drawings disclosing typical embodiments of the present invention. Throughout the drawings, corresponding parts are designated by like reference characters.

Fig. 1 is a schematic diagram of one system embodying principles of the invention.

Fig. 2 is a combined schematic diagram and flow chart showing the transformation of the signals as they proceed through portions of the apparatus of Fig. 1.

Fig. 3 is a generally diagrammatic sectional view of one corner of the image forming screen with means for coloring the images.

Fig. 4 is a detailed view of a portion of an image which may be formed on the screen S to denote a ship moored at a dock, with the reflectivity of neighboring objects indicated by characteristic colors, and Fig. 5 is a schematic diagram of a system which may be substituted for that portion of the apparatus lying below the line 5—5 of Fig. 1.

Generally speaking the invention comprehends irradiating a distant object, as with ultra-high frequency radio waves or pulses, and forming a reproduction of such object in color, tones, or characteristic texture indicative of the reflectivity of the respective portions of such object. A typical apparatus for carrying out these functions is shown in the drawings and comprises a directive antenna A adapted to project collimated electromagnetic waves against successive portions of an object to be surveyed, and to collect energy reflected therefrom. Signals derived from the reflected waves are passed through compensating means C adapted to render the signals substantially independent of such extraneous factors as range, and glancing angle. The compensated signals, which then are indicative of reflectivity, are segregated by a commutator K, so as to be available to control image characterizing means I, such as a group of color filters, for chromatically or otherwise modulating the image formed on a screen S.

Referring now in greater detail to Fig. 1, the present invention is disclosed in connection with a reflected wave or reflected pulse type of ultra high frequency radio system. A control oscillator II of any well known type provides an alternating voltage having a frequency preferably in the audio range, and suitable for frequency control purposes. The output wave from the oscillator 11 is shown diagrammatically at 11' and may be used directly to sinusoidally modulate the carrier wave of a transmitter 14. Preferably, however, the oscillator 11 is connected to a pulse generator 12 which converts the substantially sinusoidal oscillations fed to it into pulses of any desired shape, magnitude and duration having a repetition rate equal to the frequency of the oscillator 11. The pulse generator 12 may employ well known clipping and other suitable wave shaping circuits in a conventional manner to form square or trigger pulses 12'. These trigger pulses 12' are supplied to the transmitter 14 so as to render a magnetron or other high frequency oscillator momentarily operable. The transmitter 14 thus is caused to produce extremely short pulses 14' having a duration of perhaps 1 microsecond. The carrier frequency waves or pulses are fed through a rectangular waveguide 16 to the antenna A. The type of radiated energy to be utilized depends largely upon the use to which the apparatus is to be put; for normal use in connection with object detection or terrain scanning, it is customary to use extremely brief radio frequency pulses, produced at from 2,000 to 6,000 times per second, though this range may be extended as necessary.

The antenna A comprises an energy collimator and scanning means adapted to sweep a radiation pattern against successive portions of a remote object or field of view. The energy pulses thus are projected from the antenna against the object and are reflected back along substantially the same path so as to be collected by the same antenna A. The antenna A is adapted to scan successive portions of the object within a solid angle in space, and preferably projects an energy lobe about a spiral conical path included within a complete hemisphere, preferably by means of a circular nodding-rotational motion. This motion may be provided by rapidly spinning the radiating system about a central or spin axis 18, while relatively slowly nodding the system about a transverse or nod axis 19, preferably perpendicular to and rotatable with the spin axis.

Although any type of antenna A might be used to produce electronic or mechanical scanning, a simple form of apparatus may comprise a spherical or parabolic reflector 21 attached to a supporting member 22 which is pivotally mounted between the arms 30 of a yoke or other support 23. A motor 24 mounted on the yoke 23 carries a crank 25 on its drive shaft, with a connecting rod 26 extending from the crank to a lever arm 27 mounted radially on the member 22. The motor 24 preferably rotates at relatively low speed so as to produce a nod of the reflector 21 at a corresponding rate about the axis 19. A stationary motor 29 rotates the yoke 23 about the spin axis 18 by means of a bevel drive pinion 31 and a bevel gear 32 mounted on a hollow column 28 journalled about the spin axis 18. Thus the entire antenna system may be controlled by means of the motions produced by motors 24 and 29 to scan through a spiral conical path, and thereby project the radiation pattern onto successively adjoining portions of the object.

The rectangular waveguide 16 is connected to a cylindrical waveguide 33 which enters the antenna A by passing concentrically through the column 28. The energy then proceeds through portions 35, 37 and 38, and through rotatable joints 34 and 36 at the axes of rotation, to a radiating member 39 within the cavity of the reflector 21, which reflector collimates the energy for projection into space. The transmitted pulses 14' are emitted as a highly directive pattern of radio frequency waves from the antenna A at a pulsing frequency sufficiently high to insure that all objects within the field of view are irradiated during the scanning cycle, the period between waves being long enough to permit the radiant energy to travel to the most remote point of the scanned object or field, and to return to the region of the transmitter.

A sweep circuit mechanism 7 mechanically connected to the antenna A is adapted to convert the spiral scanning motion of the reflector 21 into corresponding cathode or light ray deflecting potentials for an oscilloscope or picture tube 8. The sweep circuit mechanism 7 comprises a two-phase generator 9 having a field winding 10 and rotor windings 13 spaced electrically 90° with respect to one another. The rotor windings are driven synchronously with the spin motion of the reflector 21 by means of a mechanical connection 15 between the rotors and the gear 32. The field winding 10 is energized by the variable output of a bridge circuit 17 having a contact arm oscillated in synchronism with the nod motion of reflector 21 by means of a mechanical connection 20. Accordingly, the rotors 13, terminating in spiral sweep connections 61, produce sinusoidal waves having a frequency coinciding with the spin velocity, contained in an envelope varying in amplitude on opposite sides of a neutral axis with the nod motion. The amplified voltages across connections 61 when placed on the vertical and horizontal plates of the cathode ray tube 8 produce spiral conical scanning on the screen S, with the cathode ray motion synchronized with the motion of the reflector 21.

The wave guide 16 continues on past the point of intersection with guide 33 to form a guide 16' providing a return path for the reflected energy to suitable apparatus adapted to derive signals from the reflected waves. Such apparatus may comprise a receiver and detector 42, protected by a limiter 41, interposed between the guide 16' and the receiver 42 so as to protect the receiver against strong pulses conveyed directly from the transmitter 14. The limiter 41 is of well known construction and comprises a device having a relatively high impedance to strong signals and relatively low impedance to weak signals. One well known type of limiter utilizes a gas-filled resonant chamber having electrodes that flash over and discharge the device when strongly excited, thus effectively damping the exciting oscillations. The electrical length of the wave guide 16' is selected to reflect a very high impedance at the point of connection at the wave guide 33 when directly transmitted pulses discharge the limiter. The receiver additionally is biased to cut-off at the moment each pulse 14' is transmitted by a direct connection 40 from the pulse generator 12.

The signals derived from the reflected waves have an amplitude depending largely upon the distance that the waves have travelled to and from the reflecting surfaces and to some extent upon the nature of the reflecting surface. It is well known that some materials reflect radio frequency waves more effectively than others. As an illustration, various commonly known materials appear in the following table with approximate reflectivities given in terms of the percentage of the total incident wave reflected, as based upon estimates derived from experiments and observations. The figures given for reflectivity are subject to variation depending upon the physical condition of the reflecting surface, and specifically upon the amount of moisture present in the material, but the table is useful in indicating that the reflectivity of various objects varies from roughly 1 to 100 per cent.

REFLECTIVITY OF COMMONLY KNOWN MATERIALS

With 10 cm. radio waves

[Zero glancing angle]

| Types of Material | Reflectivity (percent reflection) |
|---|---|
| Rock | 3-4 |
| Earth (varying with wetness) | 15-30 |
| Wheat field | 1-2 |
| Deep grass | 3-4 |
| Short grass | 10 |
| Tar or asphalt road | 3-4 |
| Cement (varying with wetness) | 8-10 |
| Forest: | |
|    Deciduous trees | 5-15 |
|    Evergreens | 3-10 |
| Water | 60-70 |
| Metal: | |
|    Military tanks, trucks, automobiles, oil tanks, ships, etc. | 95-100 |
| Buildings: | |
|    Brick | 3-4 |
|    Wood (varying with thickness and water content) | 15-25 |
| People | 60-70 |

The present apparatus provides means for compensating the received signals for such extraneous factors as range and average glancing angle, which cause the signals to attenuate and therefore to no longer denote the signal strength at the point of reflection, or, of course, the signal strength from a primary radiator. This has been done in the present apparatus by selective amplification of the signals as a function of their range, as measured by the time required for radiant energy to travel to the reflecting surface and to return to the receiving apparatus, or from a primary radiator to the receiving apparatus.

As shown in Fig. 1, such a range compensator C may comprise an amplifier 43 having input connections 44 extending from the receiver 42. The amplifier 43 is provided with gain control connections 45 adapted to vary the amplification as a function of attenuation due to the travel time of the radiant energy. Although the connections 45 may be controlled directly by saw-tooth waves or the like, denoting range along the general lines illustrated in concurrently filed application of Gifford E. White, Serial No. 473,258, entitled "Signal compensating system," use may be made of a cathode ray variable amplifier tube 46 which is adapted to control the amplifier 43 so as to compensate for range attenuation, as shown in Figs. 1 and 2. An automatic volume control 47 has input connections 48 tapping onto the amplifier connections 44 and renders the received pulses of substantially uniform magnitude for application to vertical deflecting plates 49. The cathode ray or electron stream of the tube 46 is swept horizontally as by a saw-tooth wave 51' applied to horizontal deflecting plates 55. The saw-tooth wave is produced by a generator 51 triggered at the beginning of each cycle by the pulse generator 12. The screen or target 52 of the tube 46 is provided on its inner surface with an electrode or conducting element 53 on which the electron trace 58 may impinge whenever a signal is received. The trace of the electron stream extends along a horizontal line beneath the electrode 53 in response to the saw-tooth wave 51' unless the stream is deflected vertically by the reception of a reflected radiant energy pulse. The momentary impingement of the electron stream onto the electrode 53 produces a flow of current between the cathode 54 and electrode 53, which current varies in intensity with the area of the electrode exposed to the electron stream, so as to control the gain of the amplifier 43 through connections 56. The momentary pulses appearing on plates 49 form pips or sharp peaks 57 in the trace 58 to a substantially uniform height by virtue of the control 47. It will be apparent that the pips 57 will be spaced horizontally as a function of the range, or travel time of the radiant energy; hence by forming the electrode 53 so that the area exposed to the pip at any instant is an inverse function of the attenuation due to range, the gain control of amplifier 43 may be adapted to restore the signals to a condition denoting reflectivity.

As an example of a typical operating condition, Fig. 2 discloses a group of reflected pulses or signals P having amplitudes first as they appear across the output connections of the receiver, and finally corresponding pulses P' as they are delivered by the amplifier 43. In Fig. 2 reading from left to right the signals P designate reflections received from near, intermediate, and distant objects that reflect 10%, 50% and 90% respectively of the incident energy. The automatic volume control 47 is effective to produce pips 57 of uniform height, which pips may be formed on the electrode 53. Since later received signals form pips that are projected on a considerably larger area of the electrode 53 than those formed by earlier received signals, the amplifier 43 may be controlled through connections 56 to amplify the signals selectively according to their range. Hence, the originally received signals P are compensated, and the amplitudes are fully or even over corrected for distance attenuation so as to indicate relative reflectivity. These signals may be applied directly to the picture tube to produce a representation, the portions of which have a brightness or tone, characteristic of the reflectivity of the corresponding portions of the irradiated object. Otherwise the amplitude of the signals delivered by amplifier 43 may be used to control coloring means or other image characterizing means I adapted to modify the images in terms other than brightness alone, as will appear.

It is well known that the signal strength of a reflected radiant energy wave depends also to varying degrees upon the glancing angle or angle which the incident wave forms with the normal line from a tangent plane on the reflecting surfaces. Some compensation for glancing angle effects may be obtained, as an average, by providing an increase in the gain of the amplifier 43 as the glancing angle increases. A simple procedure to obtain this result is disclosed in Fig. 1 and comprises connecting the amplifier 43 across one phase of the spiral sweep connections 61 through wires 62. Accordingly, as the nod angle increases, the voltage across connection 61 increases and the gain of amplifier 43 may be varied correspondingly.

The energy reflected toward the source falls off as the glancing angle increases. With some reflecting objects such as trees or shrubbery substantial reflection toward the source occurs, even when the glancing angle is appreciable. With bodies of water, on the other hand, the amount of attenuation due to glancing angle is a function of the condition of the water surface. Hence, a turbulent sea may be indicated to a pilot flying over water, by the reception of reflected energy therefrom at a relatively large glancing angle. Likewise, the degree of roughness of any surface of a known material may be determined as a function of the glancing angle or angle of nod when the spin axis is normal to the object, at which individual or integrated reflections of predetermined strength are received.

The received signals when compensated for range may be segregated in any convenient manner according to their amplitude or other typifying characteristic such as to identify the corresponding images in terms of color, tone, texture or the like. Use is made of a commutator device adapted to segregate the signals according to their amplitude, and hence according to the reflectivity of the corresponding reflecting portions of the scanned object. The commutator K comprises a cathode ray tube 63 having separated commutator segments 64, 65, and 66 designating low, intermediate, and high reflectivity, respectively. By deflecting an electron stream from an initial position to the left of the segment 64, as shown in Fig. 1, to the right as a function of the signal amplitude, a current may be set up in one or more of the segments by virtue of the impingement thereupon of the electron stream.

The tube 63 is provided with control means or horizontally deflecting plates 67 which connect with the output of the amplifier 43 as by wires 68. The electron stream 69 may be of ribbon cross-section, formed by directing a stream of electrons through a collimator or accelerating electrode 71 having a slotted aperture 72 of the general configuration of the desired cross-section of the electron stream. The flow of current from each of the segments may be made to control the image characterizing means I, specifically by bringing one or more color filters into operative relation with the screen S. For purposes of illustration, the filters may be colored red, green, and blue; portions of irradiated objects having high reflectivity and hence producing signals of relatively large amplitude may be designated arbitrarily by red, while whose portions having lower reflectivity may be characterized by green and blue according to the degree of reflectivity. The segments are separated along diagonal lines so that the ribbon-like electron stream may impinge upon any two adjoining segments simultaneously. As will appear more fully the effect thereby produced is to mix the respective colors on the screen S and thereby produce a continuous scale of hues from one end of the spectrum to the other according to the relative concentration of electrons on the respective segments.

It may be desirable to obliterate or at least to dim the electron stream 69 during the time that it traverses its path from the initial position to the segment correlated with the potential on plates 67. The desirability of thus momentarily keying the tube 63 into a substantially biased off condition may be appreciated when it is realized that the electron stream in proceeding to the red segment 66 must first traverse the blue and green segments 64 and 65 and might react therewith in an undesirable manner, even though the time interval during the sweeping motion is almost negligible. Accordingly, apparatus is disclosed in Figs. 1 and 2 by which the stream may be keyed off during the period of deflection.

Such apparatus may utilize a differentiating circuit diagrammatically illustrated in the drawings as a rate of change device 73 which may comprise a loosely coupled transformer, or the well known resistor-capacitor differentiating circuit. As illustrated in Fig. 2, this device forms the derivative of the envelope of the received signals, and produces a pulse whenever the amplitude of the signal varies. Only a single signal is shown at the left of the rate of change device in Fig. 2 to illustrate the mode of operation of the device 73, though all signals react in a similar fashion. This signal, under a typical operating arrangement, may rise from zero to maximum amplitude during a small fraction of a microsecond, followed by a brief period at a substantially steady maximum value, followed by a decrement period also comprising a small part of a microsecond. During the time that the signal is building up or falling off in amplitude the rate of change device 73 is energized and produces positive and negative blocking pulses 74 and 75, respectively. These pulses then may be passed through a fullwave rectifier 76 which is operative to locate both pulses 74, 75 on the same side of the zero voltage axis. As shown in Fig. 1, the pulses from the rectifier 76 may be connected to the control electrodes of the cathode ray tube 63 through wires 77 so as to reduce the spot intensity or eliminate the electron stream during the periods that the pulse is rising to or falling from its peak value. Accordingly, while the stream is undergoing deflection it is effectively shut off. Upon coming to rest on the proper electrode the blocking pulse becomes zero and the stream is allowed to impinge upon the proper segment. Likewise when the deflecting potential falls off, the pulse produced by the device 73 causes the electron stream to be shut off while the stream returns to the normal or initial position.

As previously indicated, the responses from the respective segments 64, 65 and 66 may be utilized to control color filters or other means characterizing the images formed on the screen S. Such a system may utilize the principles employed in connection with color television wherein a plurality of coloring agencies or filters are brought successively into cooperative relation with the screen S of the picture tube 8. With such an arrangement it becomes necessary to restrict operation to such signals as properly characterize the color filter concurrently cooperating with the screen S. Thus, at the moment that the red filter or filters are in control of the screen S, only those images concurrently controlled by signals from the segment 66 are to be formed. This result may be accomplished easily by connecting the segments 64, 65 and 66 with a color commutator 78 comprising a plurality of drums 81, 82, and 83 operable in synchronism with the coloring means and having conductive sectors extending from a central rod 84 to brushes 85, 86, and 87, respectively. Each of the brushes connects with its corresponding segment 64, 65 or 66 through an adjustable resistor 88 by means of which the signals may be compensated for the light transmission factor of the respective filters.

The responses from the color commutator 78 are picked off the rod 84 by means of a sliding contact which connects with an amplifier 97. The output of the amplifier 97 is connected with the control grid 98 of the picture tube 8 and thus may key the tube whenever an image forming pulse is received. The image element or light spot meanwhile is properly located on the screen S by means of the two-phase control voltages operating on the horizontal and vertical deflection plates 99 and 100, respectively, through wires 61. The amplitude of the two-phase deflection voltages may be controlled as by means of amplifier 101.

Any type of color screen may be used to characterize the images formed by the picture tube 8. Although use may be made of a color disc 89 of the type shown in Fig. 5, the use of such a disc may be precluded in some instances because of space considerations, in which event use may be made of an oscillating slotted grating 91 of the type shown in Figs. 1 and 3. The grating may be oscillated within slides 92 over narrow color filters on the tube, as by means of rotating cams 93 adapted to produce a minute shift in the grating in a direction transversely of the slots 94. Both the grating and the color commutator 78 may be operated in synchronism as by a motor 95 which may be provided with a suitable speed adjusting mechanism so as to allow the mechanism to operate at any suitable frequency, for example in the range of from 2 to 20 cycles per second. The cams 93 may connect with the rod 94 by means of bevel or other gearing 96.

In conjunction with the oscillating grating 91 the picture tube may be provided across the screen portion thereof with very narrow strips of transparent colored material or filters 90 extending in the direction of the slots, and designating the primary colors or other colors in groups repeated across the entire face of the tube, although only several groups of these filters are shown on an enlarged scale in Fig. 3. The grating 91 comprises a mask of opaque material such as thin sheet metal, the narrow slots of which extend in parallel relation across the screen S, with the slots spaced apart by the distance separating the respective groups of filters. As this mask is driven back and forth across the face of the cathode ray tube, each slot scans its particular group of color filters so that at any one moment either red or blue or green alone would be visible. However, a response may be produced at substantially the same point on the screen S for two colors, in which case the colors are automatically blended by the observer. Since the grating oscillates according to simple harmonic motion, its velocity at the middle point of each cycle is greater than at the ends thereof. As a consequence, it may be necessary to form the intermediate color filters 90 of a greater width than the adjoining filters so that each filter is visible during substantially equal time intervals. Also since each slot 94 traverses the intermediate filter twice during a single cycle, that is, during the forward and return motions, it is desirable to form the corresponding conductive means on the drums 81, 82 and 83, as two sectors spaced 180 degrees apart. The total arc subtended by the conductive sectors on the drums is less than 360 degrees to compensate for the transition time, that is, when the slots 94 are straddled across two adjoining filters. By thus making the sectors smaller the device is rendered inoperative except at those times that each slot 94 is completely aligned with one of the color filters 90.

Fig. 4 discloses a typical image which may be formed on the screen S. The image is formed by the impingement on the screen S of the electron stream as it progresses recurrently through a spiral conical path. With the apparatus disclosed, highly reflective objects such as the metal ship 102 may be colored red by means of the appropriate filter 90 while the portions of the representation denoting water and land may be correspondingly colored according to the reflectivity of the scanned portions. In order to obtain the maximum effect from the respective filters it may be desirable to use a picture tube 8 having a screen forming substantially white images. The time required for decay of phosphorescence of the tube 8 may be determined by the interval between successive pictures, and generally should be maintained sufficiently high to avoid objectionable flicker.

Fig. 5 discloses a modification of the arrangement shown in Fig. 1 wherein a simplification of parts has been effected. Instead of employing the cathode ray tube 46 to obtain variable amplification of the pulses use may be made of a variable-gain amplifier 103 controlled by the saw-tooth wave generator 51. The amplifier 103 may utilize a variable mu tube or other tube having similar characteristics. As an example of operation, the saw-tooth wave generator 51 may vary the screen voltage on such a tube in the amplifier 103 as a function of the time interval between the generation and transmission of the pulse on the one hand and the reception of the reflected pulse on the other hand. It is probable that the control on the amplifier 103 should be such as to vary the gain as a power of the travel time. The slope of the upper edge of the electrode 53 in Fig. 2 likewise follows a similar curve though the shape may not be strictly governed by such a power function but may be an empirical curve which may be plotted as results of experiments.

The reflectivity commutator disclosed in Fig. 5 is somewhat simpler than the cathode ray tube device shown in Fig. 1, but the color effects produced thereby are dissimilar. In Fig. 5 use may be made of a series of stripper circuits 104, 105, and 106, incorporating mechanism rendered electrically conductive at successively greater voltages, for example, thermionic tubes biased at successively greater cut-off voltages. Thus the weaker signals will operate only circuit 104 while intermediate and strong signals may operate circuits 105 and 106, so that the strongest signals operate all three circuits. The color commutator 78 may comprise three drums having conductive sectors correlated in position with the respective filters of the color disc 89.

As an example of operation of the device shown in Fig. 5, a brief radio frequency pulse is transmitted to the antenna A in response to a control pulse from the generator 12. The antenna directs the radio frequency energy upon successive portions of the object to be scanned and collects reflected energy therefrom. The reflections are transmitted by guide 16' to the receiver and detector 42, which previously had been biased to cut-off by a directly transmitted pulse from the generator 12 so as to protect the receiver against strong direct waves from the transmitter 14. The saw-tooth wave generator 51 produces a wave of gradually increasing intensity at the start of each cycle which wave may be impressed on the amplifier 103 in such a manner as to increase its gain as a power function of travel time, and thereby compensate for attenuation due to the range of the reflecting object. The pulses leaving the amplifier 103 are characteristic of the reflectivity of the reflecting portion, and if not impressed directly upon the control circuit of the picture tube 8 may be characterized so as to form a colored image as by means of the reflectivity commutator K. The pulses operate the stripper circuits 104, 105, 106 according to the magnitude of the pulses, which pulses may cooperate with the commutator 78 and the filters of the color disc 89 to produce corresponding colored images.

Some compensation has been shown for the effect caused by glancing angle but it will be understood that the attenuation resulting from appreciable glancing angle becomes very pronounced with certain reflecting bodies whenever the glancing angle exceeds a predetermined minimum. Calm bodies of water are known to reflect very little energy to the source when the glancing angle exceeds a few degrees. With other objects such as vegetation, and certain types of earth formation, the attenuation due to glancing effects is not so drastic and may be compensated for to an appreciable extent by the gain control means presently disclosed. Hence, objects which display marked attenuation as a function of glancing angle, as indicated by a gradually changing color toward the periphery of the screen S generally denote a body of water, such as a lake or ocean. If the scanning is performed by moving the lobe of radiant energy through a narrow solid angle in space, glancing angle effects are minimized, and in general may be ignored.

As many changes could be made in the above construction and many apparently widely different embodiments of this invention could be made without departing from the scope thereof, it is intended that all matter contained in the above description and shown in the accompanying drawings shall be interpreted as illustrative and not in a limiting sense.

What is claimed is:

1. A method of forming pictorial representations of objects having portions thereof irradiated by high frequency electromagnetic energy, said method comprising receiving reflections from said irradiated portions, forming images of said respective portions in accordance with energy reflected therefrom, compensating said reflected energy for range attenuation, and chromatically characterizing said respective images according to the amplitude of the corresponding compensated energy.

2. In apparatus for irradiating successive portions of an object and for forming pictorial representations of said portions in response to radiant energy reflection signals from said portions, the combination comprising means for compensating said signals for attenuation due to range, means responsive to said reflection signals for forming images designating said portions and color means cooperative with said images for forming representations colored as a function of such compensated signals.

3. Apparatus for forming colored images, comprising directive antenna means adapted to irradiate successive portions of a remote object with radio frequency waves and to receive reflections therefrom, means for resolving said reflections into signals indicative of the reflectivity of the respective portions of said object, and means responsive to said signals for forming representations of said portions in colors designating such reflectivity.

4. Apparatus as claimed in claim 3 wherein said resolving means comprises a cathode ray tube having a target along a dimension of which a cathode ray may be projected as a function of the range of said reflections, the area exposed to said ray increasing as a function of the dimension denoting range.

5. Apparatus for forming pictorial representations of an object in accordance with radio waves reflected from successive portions of said object, said apparatus comprising means for deriving signals from said reflected waves, means for compensating the amplitude of said signals for attenuation due to the range of said portions from said apparatus, means responsive to said signals for forming images of said portions of said object, and coloring means for forming with said images representations colored as a function of the amplitude of said compensated signals.

6. Apparatus as claimed in claim 5 wherein said coloring means includes separate successively operable color filters.

7. Apparatus as claimed in claim 5 wherein said coloring means includes an electron-tube commutator having an electron stream, spaced electrodes, deflecting means adapted to sweep said stream along said respective electrodes in accordance with the amplitude of said compensated signals, and signal differentiating means adapted to key said electron stream when said stream is deflected.

8. Reflectivity-denoting apparatus adapted to segregate signals derived from radio waves reflected from objects according to the reflectivity characteristics of said objects, said apparatus comprising a commutator having segments defining different magnitudes of reflectivity, said commutator comprising a cathode ray tube having said segments disposed as targets within said tube, means for correcting said signals for range attenuation, said cathode ray tube including deflector elements responsive to said corrected signals for deflecting the cathode ray onto said respective segments according to a strength characteristic of said signals, and indicating means having reflectivity denoting means responsive to the impingement of said cathode ray onto said respective segments.

9. Apparatus as claimed in claim 8 including means operative by said signals for shutting off said ray during the deflecting motion of said ray.

10. A method of determining the turbulent condition of the surface of a body of water from a point remote from said body, comprising directing a beam of electromagnetic waves substantially normally to said surface, deriving signals from waves reflected from said surface, compensating said signals for range attenuation, shifting said beam from the normal position, and determining the attenuation in said signals introduced by thus shifting said beam.

11. Scanning apparatus comprising means for irradiating successive portions of an object with a beam of electromagnetic energy directed at varying angles from a perpendicular to said successive portions, means for deriving signals from electromagnetic reflections from said object, and means for compensating said signals for attenuation resulting from changes in said angles.

12. A method of forming a colored representation of a remote object comprising the steps of irradiating said object with a collimated beam of radio energy, receiving reflections therefrom indicative of said object, determining the quantitative reflectivity characteristics of said object and forming images thereof chromatically characterized in accordance with the textural nature of said remote object.

13. In a method of projecting radio frequency waves upon successive portions of an object and forming images of said portions in response to waves reflected from said portions, the steps comprising irradiating said object with a directed beam of radio energy, receiving reflections therefrom, converting said reflections into images indicative of said object, determining the quantitative reflectivity characteristics of said object and chromatically modifying said images in accordance with said reflectivity characteristics.

14. In a method of irradiating an object with electromagnetic radio energy and deriving radio signals from radiant energy reflected therefrom, the steps comprising receiving said reflected radio signals, converting said signals to images indicative of said object, and chromatically characterizing said image according to the degree of electromagnetic reflectivity of said object.

15. A method of forming a colored representation of a remote object comprising the steps of irradiating said object with a collimated beam of radio energy, receiving reflections therefrom, converting said reflections into images indicative of said object, determining the quantitative reflectivity characteristics of said object, and chromatically defining the nature of said object as a result of said reflectivity characteristics.

WALDEMAR A. AYRES.

REFERENCES CITED

The following references are of record in the file of this patent:

UNITED STATES PATENTS

| Number | Name | Date |
| --- | --- | --- |
| 1,985,685 | Nicolson | Dec. 25, 1934 |
| 2,178,237 | Linder | Oct. 31, 1939 |
| 2,075,808 | Fliess | Apr. 6, 1937 |
| 2,143,035 | Smith | Jan. 10, 1939 |
| 2,167,492 | Sproule | July 25, 1939 |

FOREIGN PATENTS

| Number | Country | Date |
| --- | --- | --- |
| 497,147 | Great Britain | Dec. 9, 1938 |
| 108,556 | Australia | Sept. 14, 1939 |